United States Patent
Saxton et al.

(10) Patent No.: US 10,673,919 B1
(45) Date of Patent: Jun. 2, 2020

(54) CONCURRENT INPUT MONITOR AND INGEST

(71) Applicant: Amazon Technologies, Inc., Reno, NV (US)

(72) Inventors: John Robert Saxton, Portland, OR (US); Ryan Hegar, Happy Valley, OR (US); David Scott Montgomery, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 748 days.

(21) Appl. No.: 15/196,905

(22) Filed: Jun. 29, 2016

(51) Int. Cl.
*H04L 29/06* (2006.01)
*G06F 13/42* (2006.01)
*G06F 9/54* (2006.01)
*H04N 19/436* (2014.01)
*H04N 19/423* (2014.01)
*H04N 19/40* (2014.01)
*H04L 29/08* (2006.01)

(52) U.S. Cl.
CPC ............ *H04L 65/607* (2013.01); *G06F 9/546* (2013.01); *G06F 13/4282* (2013.01); *H04L 65/605* (2013.01); *H04N 19/40* (2014.11); *H04N 19/423* (2014.11); *H04N 19/436* (2014.11); *H04L 67/025* (2013.01)

(58) Field of Classification Search
CPC ... H04L 65/607; H04L 65/605; H04L 67/025; H04N 19/40; H04N 19/423; H04N 19/436; G06F 9/546; G06F 13/4282
USPC ......................................................... 709/224
See application file for complete search history.

(56) References Cited

U.S. PATENT DOCUMENTS

| | | | | |
|---|---|---|---|---|
| 6,529,146 B1* | 3/2003 | Kowalski | ............... | H03M 7/00 341/50 |
| 8,468,563 B1* | 6/2013 | Sherwin | ........... | H04N 21/23418 725/144 |
| 10,200,434 B1* | 2/2019 | Wells | ..................... | H04L 65/607 |
| 2005/0198448 A1* | 9/2005 | Fevrier | .................. | G06F 9/544 711/154 |
| 2009/0157988 A1* | 6/2009 | Mizumachi | ......... | G11B 27/034 711/154 |
| 2009/0238479 A1* | 9/2009 | Jaggi | .................... | H04N 19/172 382/236 |
| 2011/0069750 A1* | 3/2011 | Chengalvala | ......... | H04N 19/42 375/240.02 |
| 2013/0268688 A1* | 10/2013 | Galanes | ........... | H04N 21/23116 709/231 |
| 2013/0308436 A1* | 11/2013 | Li | .................... | H04N 21/23106 370/216 |
| 2014/0304756 A1* | 10/2014 | Fletcher | ............. | H04N 21/2387 725/115 |
| 2014/0359166 A1* | 12/2014 | Mamidwar | ...... | H04N 21/23439 709/247 |

* cited by examiner

*Primary Examiner* — James E Springer
(74) *Attorney, Agent, or Firm* — Hogan Lovells US LLP

(57) ABSTRACT

Media inputs, such as serial digital interface (SDI) inputs, can be concurrently monitored and ingested. An ingest process can be configured to concurrently monitor each of a set of SDI inputs. A transcoding job requiring content from one of the inputs can send a request over shared memory to the ingest process, which can copy the data to the media transcoding pipeline over shared memory while concurrently monitoring the SDI inputs. In at least some embodiments, multiple processes can concurrently ingest from a single SDI input.

20 Claims, 6 Drawing Sheets

US 10,673,919 B1

CONCURRENT INPUT MONITOR AND INGEST

BACKGROUND

Users are increasingly obtaining content in digital format, often downloading or streaming that content from a remote service. Because different users or client devices require the content to be in different formats, for example, the remote service will often perform tasks such as video transcoding. Transcoding in general involves taking input content and converting that content to a different encoding before delivering that content to a client device or other destination. In various systems, inputs such as serial digital interface (SDI) ports only allow one reader to read from that input at any given time. This prevents a system from monitoring the input at the same time in which one or more processes are reading from the input. The inability to monitor the input can result in inaccurate transcoding or other such issues.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the transcoding of media files and streams. In particular, various approaches enable media inputs, such as serial digital interface (SDI) inputs, to be concurrently monitored and ingested. An ingest process can be configured to concurrently monitor each of a set of SDI inputs. A transcoding job requiring content from one of the inputs can send a request over inter-process communication, such as shared memory, to the ingest process, which can copy the data to the media transcoding pipeline over shared memory while concurrently monitoring the SDI inputs. In at least some embodiments, multiple processes can concurrently ingest from a single SDI input.

Various other such functions can be used as well within the scope of the various embodiments as would be apparent to one of ordinary skill in the art in light of the teachings and suggestions contained herein.

Figure 1:
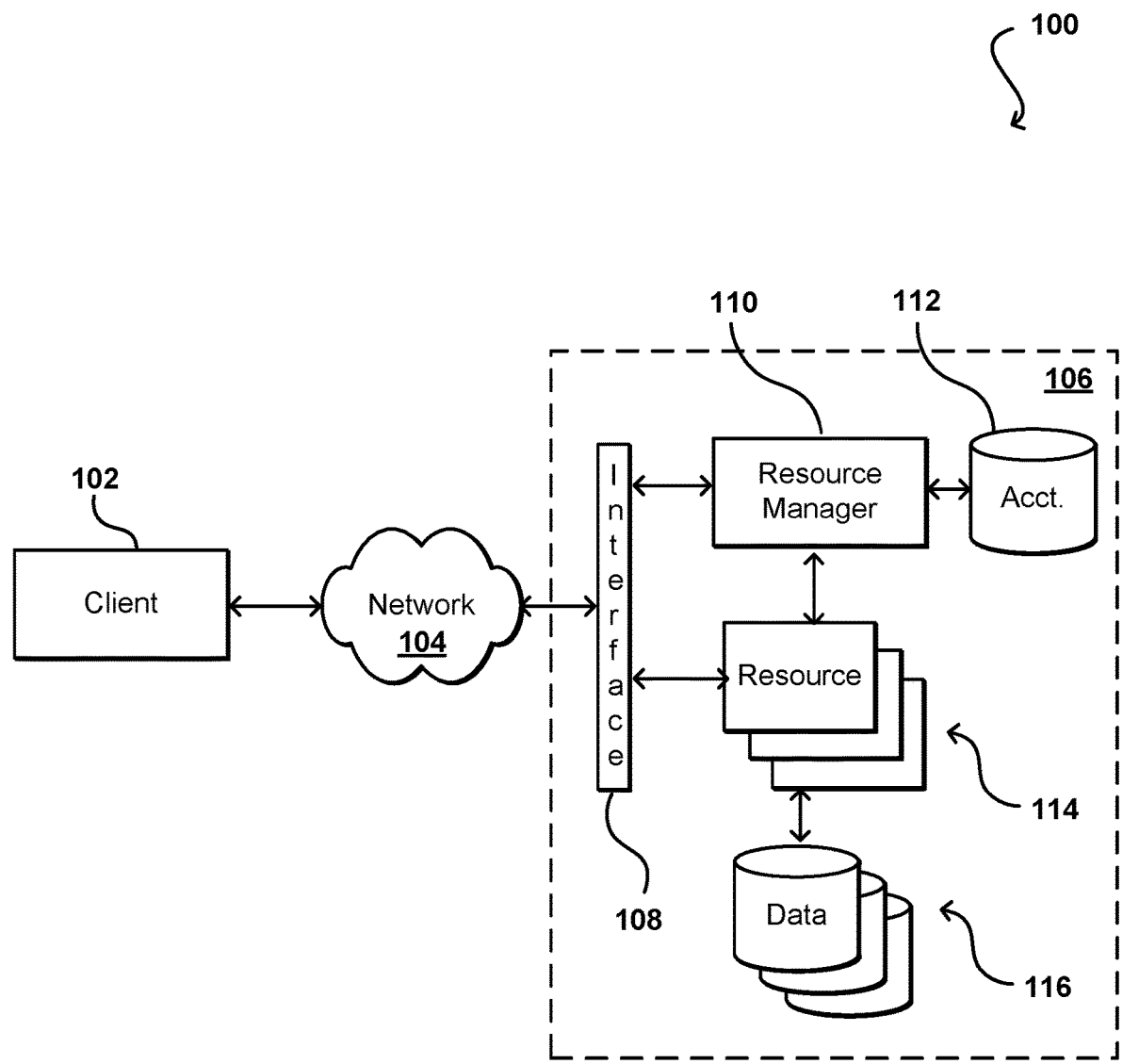
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
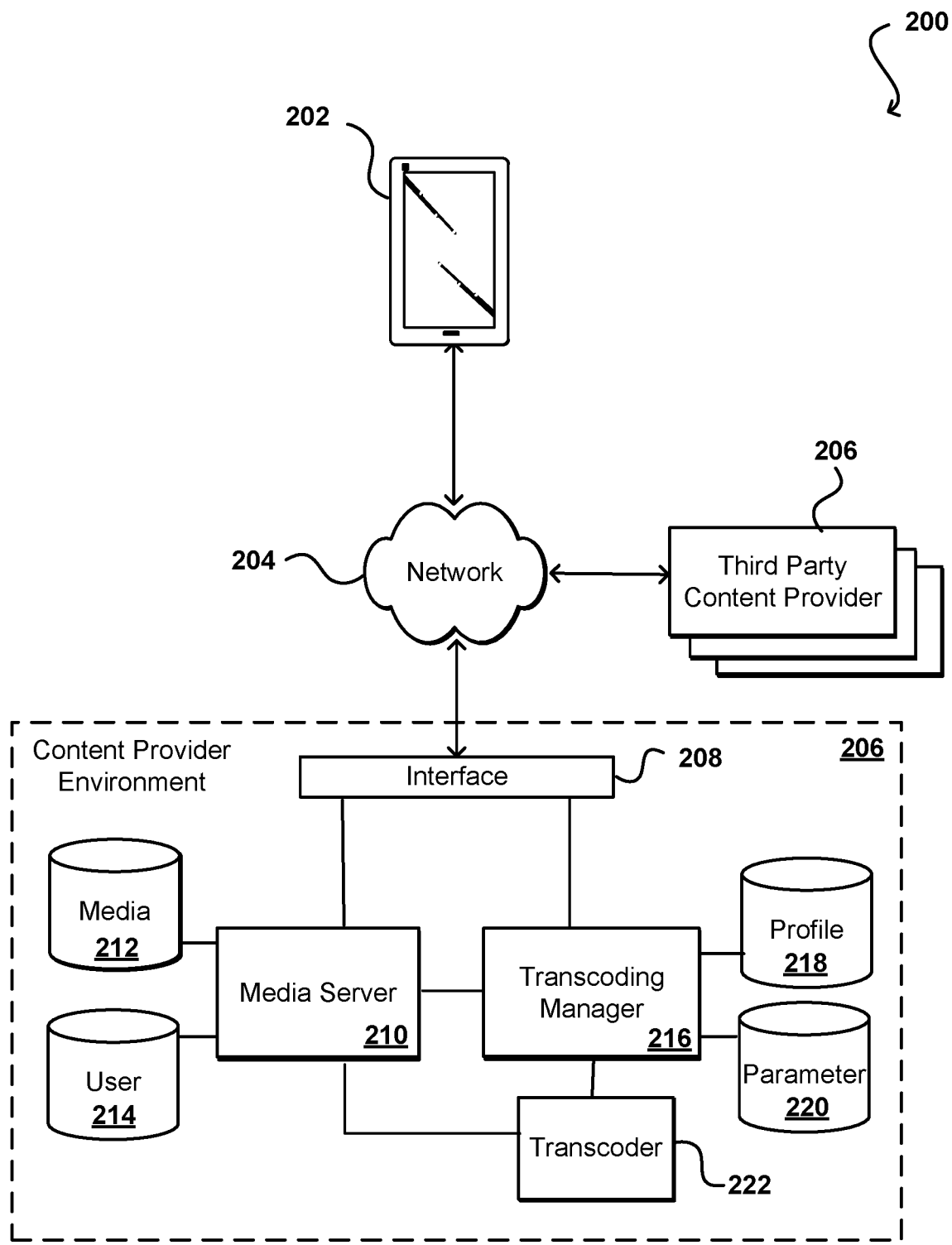
FIG. 2 illustrates an example subsystem for managing media file transcoding that can be utilized in accordance with various embodiments.

FIG. 2 illustrates an example system 200 that can be used to implement aspects of the various embodiments, in an electronic environment such as that discussed with respect to FIG. 1. In the system of FIG. 2, a client computing device 202 can submit a request for content across at least one network 204 to be received by a content provider environment 208. As mentioned, in at least some embodiments the request can include a request for content to be displayed on the computing device 202, and in many cases will include video or other media content that is transcoded for presentation on the client device 202. The network(s) can include any appropriate network, such as the Internet, a local area network (LAN), a cellular network, an Ethernet, or other such wired and/or wireless network. The content provider environment 208 can include any appropriate resources for providing content from a resource provider, as may include various servers, data stores, and other such components known or used for providing content from across a network (or from the "cloud"). As mentioned elsewhere herein, the client computing device 202 can be any appropriate computing or processing device, as may include a desktop or notebook computer, smartphone, tablet, wearable computer (i.e., smart watch, glasses, or contacts), set top box, or other such system or device. An interface layer 208, when receiving a request or call, can determine the type of call or request and cause information to be forwarded to the appropriate component or sub-system. For example, a request for content might be forwarded to a media server 212 while a request to specify encoding parameters might be forwarded to a transcoding manager 216, among other such options. These calls or requests can also come from third parties, although third party providers 506 can also provide at least some of the media content to be stored to a media repository 212 and transcoded for display on the client device 202 as discussed herein.

In this example, a call received to the content provider environment 208 can be received by an interface layer 210 of the environment. As known for network environments, the interface layer can include components such as interfaces (e.g., APIs), load balancers, request and/or data routers, and the like. If the request is a request for content, such as for a video data stream to be provided to the client device 202, information for the request can be directed to one or more media servers 210, which can obtain the content from a media data store 212 or other such repository to be sent back across the network(s) to the computing device. In some embodiments, information for the request might also be compared against user data in a user data store 214 or other such location to determine, for example, whether the user has access rights to that content, and potentially the formats or versions to which the user has access rights.

In at least some embodiments a request from an operator, an administrator, a client device 202, a third party provider 224, or another such source might include a request to specify one or more sets of encoding parameters to be used with a media file. Accordingly, information regarding the encoding parameters can be provided to a transcoding manager 216, or other such component or service, that is able to receive the information through an appropriate interface (i.e., an API or console) and cause the profile and parameter data to be stored to appropriate repositories 218, 220 as discussed elsewhere herein. When a request for a video file is received, the transcoding manager 216 can use the profile and parameter data to determine the appropriate encoding information, and can pass that to one or more transcoders 222, which can obtain the media file and transcode the media file per the transcoding information, which can then be provided to the client device by a media server 210 or other such component.

In some embodiments the transcoding subsystem includes one or more transcoders, a set of bitstreams (or video signals), and a content delivery network. The one or more transcoders can include both encoders and packagers, which can be implemented via an origin server. A packager can receive a signal (e.g., feed), such as a video signal or a live stream. The live stream feed may comprise live video content (e.g., sporting events, concert events, pay-per-view events, etc.), pre-recorded content (e.g., television shows, movies, time-delayed events, sports highlights, etc.), and/or advertisement content (e.g., commercials), among others. The packager may receive one or more input signals (e.g., input) and generate one or more bitstreams. The bitstreams can be delivered by an encoder/packager to the content delivery network (CDN). The bitstreams can represent various encoded/packaged versions of the signal feed, as may be encoded per the encoding parameters from the transcoding manager 216. For example, the bitstream may be a high resolution and/or high bitrate version of the signal feed. In some embodiments, different bitstreams may provide alternate audio (e.g., different languages) and/or closed captions. The number and/or types of the bitstreams may be varied per the profile or other data.

Each of the bitstreams may comprise a number of content segments, which may represent a portion of the bitstream. Each of the content segment files may represent one segment of playback time of the program feed (e.g., 10 second segment files may contain 10 seconds of video and/or audio). For example, when played back sequentially, the content segments may generate the content of the corresponding bitstream. In another example, the content segments may be stored locally on the end user devices (e.g., buffered) and when enough of the content segments are available the end user devices may decode the content segments for playback. The content segments may be adaptive video content. The content segments may allow the bitstream to be delivered efficiently and reliably. For example, requesting individual content segments may reduce a chance of download failure by one of the client devices. In another example, storing the content segments across the CDN may reduce an amount of storage needed at each node of the CDN. The CDN itself may include a network of computers (e.g., servers). Each of the computers of the CDN can function as a node, and the CDN can store and/or deliver the bitstreams over a wide-area network (e.g., the Internet).

An encoder/packager can be an origin active bitrate video HTTP server. The encoder/packager can receive a signal (e.g., request) and send a signal (e.g., response). The signal request can represent a data request (e.g., an HTTP request) from one of the client devices forwarded to the origin server by the CDN. For example, the signal request may be an HTTP request for the origin server to send digital data to one of the client devices. The signal response may represent a data response from the origin server to be forwarded by the CDN to one of the client devices. For example, the origin server may send the signal response (e.g., data such as the content segments) as a network packet based on the HTTP protocol to one of the client devices. The type, implementation and/or number of responses and/or requests may be varied according to the design criteria of a particular implementation. The origin server can include a manifest file or list of the available content segments. For example, the manifest file may comprise metadata and/or URLs pointing to the content segments and/or other data. The manifest file may be used by the client devices to request the content segments. A format of the manifest file may be varied according to the design criteria of a particular implementation. The manifest file and/or the content segments may have a respective time-to-live (TTL) value. The TTL value (or property) may be used to ensure certain objects in a network are refreshed. For example, objects in a network may be cached (e.g., throughout the CDN). The TTL value may represent an amount of time, a number of requests and/or a hop count before the object is refreshed (e.g., requested/updated from the origin server). The TTL value for the manifest file and/or the content segments may be set by the operator and/or set at the origin server. In a common CDN implementation, various types of content may remain stored on the CDN until the TTL value expires (e.g., content invalidation may take a long time). Generally, the TTL value of the manifest file is less than the TTL value of the content segments. A lower TTL value for the manifest file may allow the manifest file to be refreshed more frequently/often than the content segments (e.g., to update the pointers to the content segments). A comparatively higher TTL value for the content segments may allow the content segments to remain in cache longer (e.g., to reduce a number of requests made to and/or reduce a load on the origin server). The implementation and/or values set for the TTL values of the manifest file and/or the content segments may be varied according to the design criteria of a particular implementation.

The origin server may be configured to perform a content invalidation. For example, one or more of the content segments may be invalidated. Content invalidation may prevent and/or stop content from being delivered to the client devices. To initiate an invalidation of content the operator may send the invalidation signal input (e.g., the operator initiated content invalidation) to the origin server. The origin server may invalidate the content segments by updating (or manipulating) the manifest file. For example, the manifest file may be updated to no longer point to the content segments. Since the TTL value for the manifest file is relatively low, the manifest file may be refreshed throughout the CDN. For example, the client device may request the manifest file and when the TTL value expires for the cached manifest in the various nodes of the CDN, the updated manifest file (e.g., the invalidated manifest) may be distributed throughout the CDN to the client device.

A change in video stream may be initiated by a user in one example. In another example, a quality of service test may be implemented. For example, if the video stream represented using the content segments was of such a poor quality that an advertiser and/or a broadcaster would not be satisfied, the content segments may be rearranged (e.g., by providing the alternate content) and/or removed quickly. For example, if the content segments represent an advertisement of poor quality (e.g., fails the quality of service test), an alternate advertisement could be displayed by invalidating the content segments. The content segments may be invalidated automatically if the content segments do not pass the quality of service test.

An example manifest file can include various data, such as a file header, metadata, and/or pointers/links. The data can be human-readable or coded using an encoded format, an encrypted format and/or computer readable (e.g., binary) format. The format of the data in the manifest file may be varied according to the design criteria of a particular implementation. The file header can provide an indicator to identify the manifest file as a particular type of file. For example, the file header may be used by the origin server, cache nodes, and/or any other computing device to recognize the manifest file as a particular type of file (e.g., a pointer file, a manifest file, etc.). The metadata may indicate the type of file to be served when following specified links. For example, the metadata may indicate that the links represent a video stream, a bandwidth needed to playback the content segments, the codecs implemented for the content segments, the resolution (e.g., in pixels) of the content segments, and/or any other relevant data. The type of data available in the metadata may be varied according to the design criteria of a particular implementation. The pointers may point to various types of stored data. The stored data may be the content segments. For example, a pointer can be an HTTP URL link. In some embodiments, the pointers may be implemented as a RTMP link and/or an FTP link. The format of the pointers may be varied according to the design criteria of a particular implementation. The pointers of the manifest file can point to the respective content segments. The content segments in some embodiments can be implemented as Transport Stream (e.g., .ts) files. For example, the content segments may comprise MPEG-2 data. In some embodiments, the manifest file may be embedded within the bitstreams. The type of invalidation and/or recovery may be varied according to the design criteria of a particular implementation. The type of invalidation may be based on the invalidation information (e.g., instructions) provided in the invalidation signal input. For example, the signal input may be a content invalidation signal initiated by the operator.

As mentioned, however, certain inputs can only be read by one process at a time. These include, for example, serial digital interfaces (SDIs) implemented in various systems. SDIs are digital media interfaces that can support various video resolutions, frame rates, three-dimensional content, and other types of media. SDIs typically transmit uncompressed, unencrypted digital video signals, and can be used for packetized data. In a cloud-based environment, for example, the transcoding system can utilize SMPTE-2022 to send digital video over an IP network using a video format such as SDI. An SDI port in at least some embodiments will only allow for one component or process to read from the port at any given time. If the content from an SDI port on a SDI card is to be read and provided to a transcoding pipeline, for example, it is not possible in at least some systems to concurrently read from that port to perform monitoring of the SDI input using a second process.

Approaches in accordance with various embodiments can overcome these and other limitations of existing solutions by providing a dedicated ingest process that can concurrently monitor all SDI inputs on a system or device. If a user process attempts to initiate a transcoding job that is to ingest from one of these monitored inputs, the user process can send a request over shared memory to the ingest process. The ingest process can then copy data, read from the corresponding SDI port, over shared memory to the media transcoding pipeline for the user process, while continuing to concurrently monitor that SDI port and the other SDI inputs. Such an approach can also enable multiple user processes, or other such processes, to ingest content from a single SDI input using the content copied to shared memory. Various media encoders or transcoders can thus concurrently monitor a set of SDI inputs for information such as video format, audio format (i.e., pulse code modulation (PCM) audio format, Dolby Digital audio, Dolby Digital Plus, DolbyE, etc.), audio levels, resolution, frame rate, and timecodes, while being able to concurrently use those inputs to provide media to one or more transcoding pipelines. Other input types, such as asynchronous serial interfaces (ASIs) or high-definition multimedia inputs (HDMIs), can be monitored using such processes as well.

Figure 3:
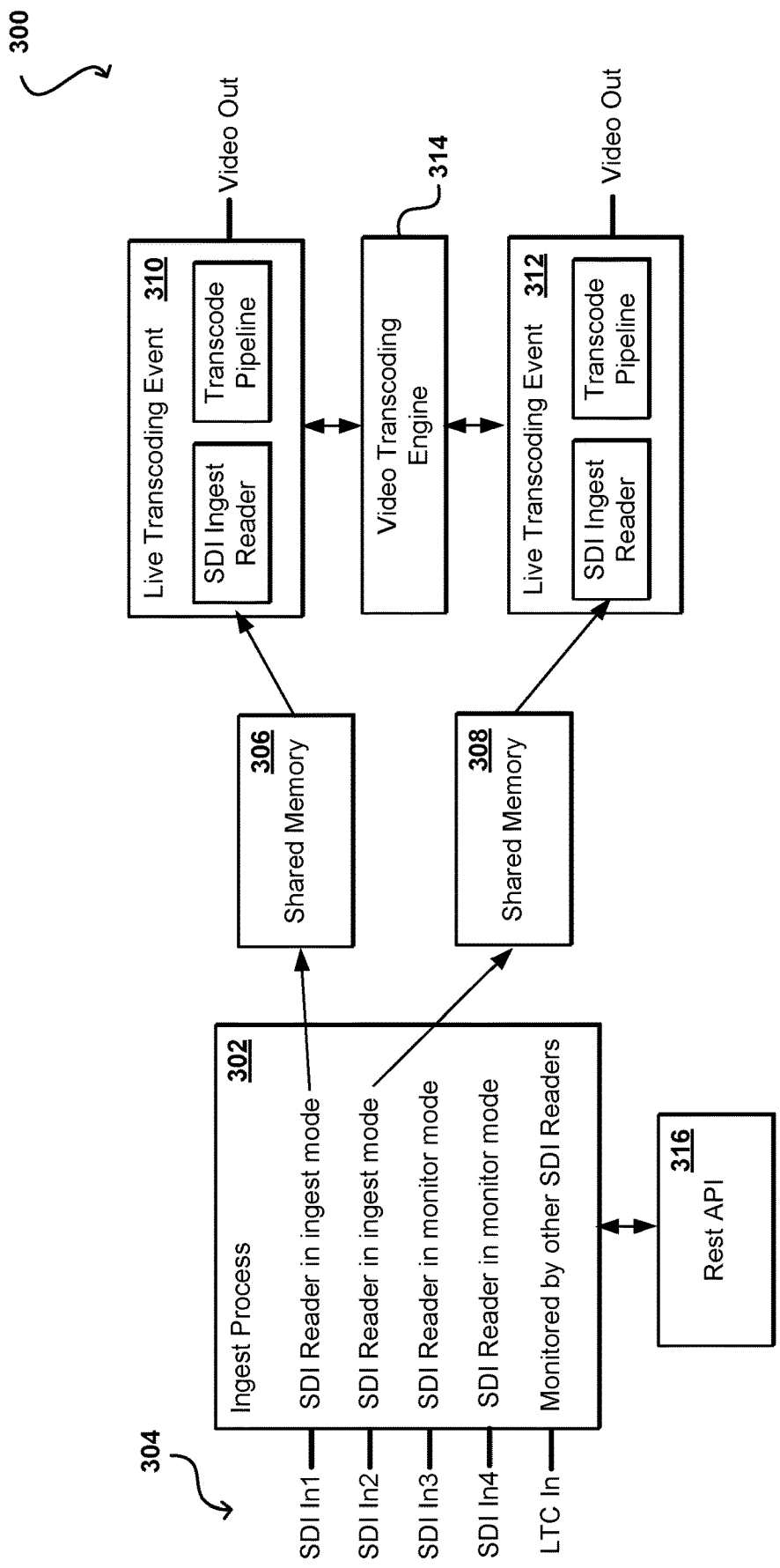
FIG. 3 illustrates an example transcoding subsystem that can be utilized in accordance with various embodiments.

FIG. 3 illustrates an example system-level diagram 300 of components that can be used to practice such functionality in an environment such as those described with respect to FIGS. 1 and 2, such as may be provided by the transcoder 222 component or system illustrated in FIG. 2. In this example diagram 300, an ingest process 302 is able to concurrently read from a set of SDI inputs, here SDI inputs In1, In2, In3, and In4. The ingest process is also able to read a linear (or longitudinal) timecode (LTC) input, which can be monitored by a set of SDI readers. Each SDI input can have its own SDI reader in the ingest process 302, here with two of the readers in ingest mode and two in monitor mode. It should be understood that while in ingest mode, the readers will continue to monitor the corresponding SDI ports as if the readers remained in monitor mode. In monitor mode, an SDI reader reads data from the corresponding SDI input and analyzes information such as the video or audio format, volume level over a sliding time window, and other such information. The SDI readers in ingest mode can perform the monitoring discussed above, but can also concurrently copy data from the corresponding SDI input to a respective shared memory 306, 308. It should be understood that the content from the SDI readers can be copied to the same shared memory, different portions of the same shared memory, or different shared memory instances or components, among other such options.

Once data from an SDI input is copied to shared memory 306, 308 by the ingest process, a process such as a live transcoding event 310, 312 can read from the shared memory. An SDI ingest reader of an event can ingest the SDI input data as if reading the data from the corresponding SDI input, and can provide that data to the corresponding transcoding pipeline which can then output the media content through the corresponding audio, video, or media output. As part of the transcoding pipeline, at least a portion of the media content may be processed using a video transcoding engine 314, which in at least some embodiments can be shared amongst the various transcoding events or processes. In some embodiments the transcoding engine is offered as a service to which various processes can subscribe. As mentioned, such an approach enables multiple SDI inputs to be monitored and ingested concurrently, which is not possible with existing solutions. For example, spinning up an external monitoring daemon would not work because only one process can read from an SDI port at a time, so a monitoring daemon would interfere with any live transcoding jobs that might be attempting to use that SDI port.

In some embodiments, live transcoding jobs could potentially monitor the SDI inputs as part of the transcoding process. A potential downside to such an implementation, however, is that idle inputs, or inputs without an active transcoding, would not be monitored by the transcoding processes. A process manager could spin up a monitoring daemon each time a live transcoding job spun down, and vice versa, but such a process can be difficult to manage in at least some environments.

Approaches in accordance with various embodiments can also provide for input failover. Using an input failover approach, if a process detects that a particular input is no longer available, the process can attempt to ingest from a different input instead. The failover should occur quickly in many instances, such that adding a handshake to shut down a monitoring daemon might not be practical given the complexity involved. The monitoring information can be reported up to a Web layer, for example, where a Rest API 316 or other such interface can be exposed that can be queried by the customer. The Rest API response in some embodiments can list all the SDI inputs, along with audio/video format, loudness, input time code, and other such information obtained through the monitoring.

Approaches presented herein can be transparent to the end user, with the user process proceeding as if reading directly from an SDI port. Enabling multiple consumers to ingest from the same SDI port can also enable various real-world workflows. As an example, one event might ingest the SDI input and produce a "clean" transcode at full resolution and full frame rate in order to preserve the original content, while another event might simultaneously ingest the same SDI content but overlay graphics on the video and/or change the resolution and/or frame rate to match the format desired by the customer. Further, other processes can ingest frames from the ingest process as well. For example, an SDI preview process can read a frame from an SDI card, convert the frame to a PNG file, and write that file to disk accessible to users and other such entities. Another benefit is that details about the underlying physical SDI card no longer matter to the live transcoding process, as those details are handled by the ingest process. The addition of a new SDI card can be handled in the ingest process, with little to nothing needing to be updated in the live transcoder.

Figure 4:
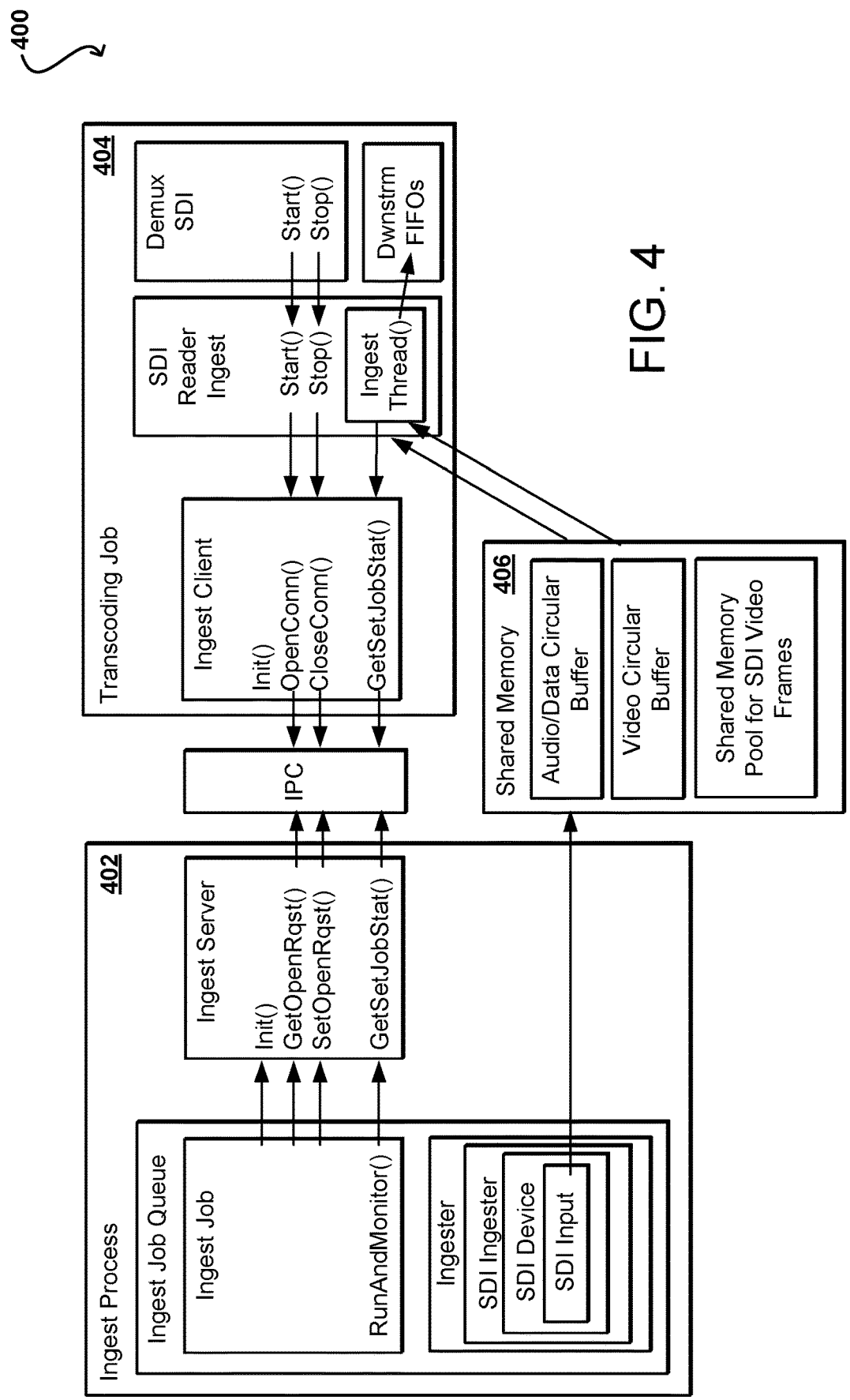
FIG. 4 illustrates example components of a transcoding subsystem that can be utilized in accordance with various embodiments.

FIG. 4 illustrates an exploded view 400 of certain components of a transcoding system. In this example, the ingest process 402 and a transcoding job 404 or process are shown to talk through inter-process communication. For an ingest job of the ingest process, an ingest server can initialize and open the request. A corresponding ingest client of the transcoding job can request to open the connection and maintain job status. The ingester of the ingest process, which can read from the SDI input of the SDI device, can write to shared memory 406. The SDI reader ingest of the transcoding job can then read from the appropriate buffer in the appropriate shared memory 406. This can include reading from an audio and/or data circular buffer, a video buffer, or a shared memory pool for video frames, among other such options. The SDI reader ingest can work with the demuxer to demux the media content and then pass the content to the transcoding pipeline, as discussed above, for processing. The data (i.e., audio and/or video) from the SDI input can then be transcoded to an indicated format for output according to the pipeline instructions. As mentioned, in some embodiments the ingest process 402 might be monitoring an idle input (not being ingested by another process) instead of an active input that is being ingested by at least one transcoding job 404. In some implementations a given server can have up to sixteen SDI ports across one or two SDI cards, although additional inputs can be used as well in other implementations.

Figure 5:
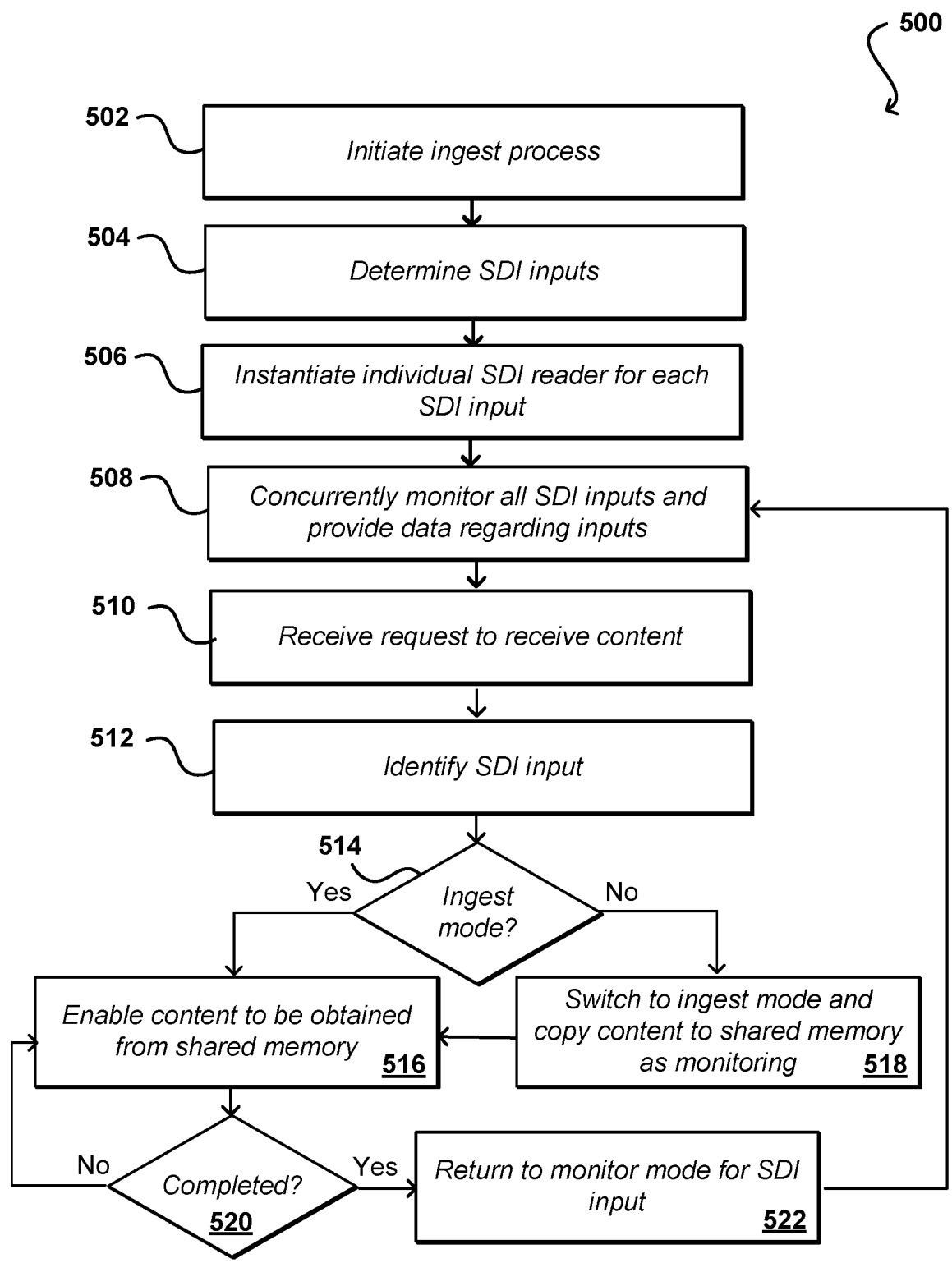
FIG. 5 illustrates an example process for concurrently monitoring and sharing various SDI ports that can be utilized in accordance with various embodiments.

FIG. 5 illustrates an example process 500 for concurrently monitoring and ingesting data from a set of media inputs that can be utilized in accordance with various embodiments. It should be understood that for any process herein there can be additional, fewer, or alternative steps performed in similar or alternative orders, or in parallel, within the scope of the various embodiments unless otherwise specifically stated. Further, although SDI inputs are used for purposes of explanation, it should be understood that various other types of media and data input can take advantage of aspects of the various embodiments as discussed elsewhere herein. In this example, an ingest process is initiated 502 at system startup or another appropriate time or event. The ingest process can attempt to determine the physical hardware on the system, such as by performing a series of API calls to determine the number of SDI cards on the system. The ingest process can then determine 504 the number of SDI inputs across those cards, and can identify each of those inputs. The ingest process can then instantiate 506 an individual SDI reader for each of the individual SDI ports, devices, or other such inputs. A reader can also be instantiated for the LTC port or another such input. In such an approach, an SDI input can then own an SDI reader. The SDI readers can then be used to concurrently monitor 508 all the SDI inputs, such as to read frames of video content and monitor information such as format and time code. For audio data information such as audio format and loudness over a sliding time window can also be monitored, among other such information. As mentioned, the data regarding the inputs can be reported up to an API of a service layer, for example, where a customer or process can obtain the data.

During the monitoring, an end user or process can determine to initiate a transcoding job, where the job is to ingest from an SDI port that is already being monitored. A request to receive the transcoded content can be received 510, and the corresponding SDI input identified 512. A determination can be made 514 as to whether the identified input is operating in monitoring or ingest mode, or whether the frames of data are being copied to shared memory in addition to being monitored by the ingest process. If not, the ingest process can cause the SDI input to switch 518 to an ingest mode where content read from the input is copied into shared memory. The content can then be enabled 516 to be read from the shared memory. The content can be read from shared memory, or another inter-process communication (IPC) component(s), until the reading of input data for the process is determined 520 to be completed. Other IPC components can include, for example, networking, sockets, queues, pipes, memory-mapped files, and the like, that an operating system can use to allow processes to share data. After completion, the SDI reader for the SDI input can be returned 522 to monitor mode and the SDI ports can continue to be concurrently monitored until such time as the SDI port is to be read again for another transcoding task, etc.

The transcoding job in some embodiments can start a demuxer process, which can initiate a demux SDI to talk with the corresponding SDI reader ingest process, which then reads from shared memory instead of directly from the SDI card. The demuxer process can demux the input into individual elementary streams, as may include separate streams for audio, video, and metadata, and direct the audio and video down respective transcoding pipelines. The transcoding process can thus send a command (i.e., start ingesting from SDI port 1 with these settings) across shared memory, which is picked up by the ingest process. The ingest process can reconfigure the SDI reader(s), whereby the ingest process will start copying frames read from the SDI device to shared memory. The transcoding process can then copy those frames out of shared memory and pass them down the video/audio transcoding pipeline. After transcoding, a muxer component or process can combine the information into a single output of the desired format. Meanwhile, the ingester can continue to concurrently monitor those SDI ports. As mentioned, multiple processes can concurrently ingest from shared memory as well in at least some embodiments. In some embodiments, it is only after the frames reach the decoder in the process, after the demuxer step, that the frames are copied out of shared memory and into a local instance that gets passed down the pipeline.

Various approaches can provide at least some level of alarming as well. For example, an ingest process can detect when an SDI input is unplugged or otherwise unavailable, and can create a corresponding alert or notification. In at least some embodiments the alert can be copied across shared memory to the process that is consuming the input so that process can generate an alert that is ultimately visible by the end user or other recipient. Further, if a large jump in the monitored input timecode is detected that is nonsensical then a system-wide alert can be generated. Other alerts can be generated as well, as may relate to a timecode not being present or being invalid.

Figure 6:
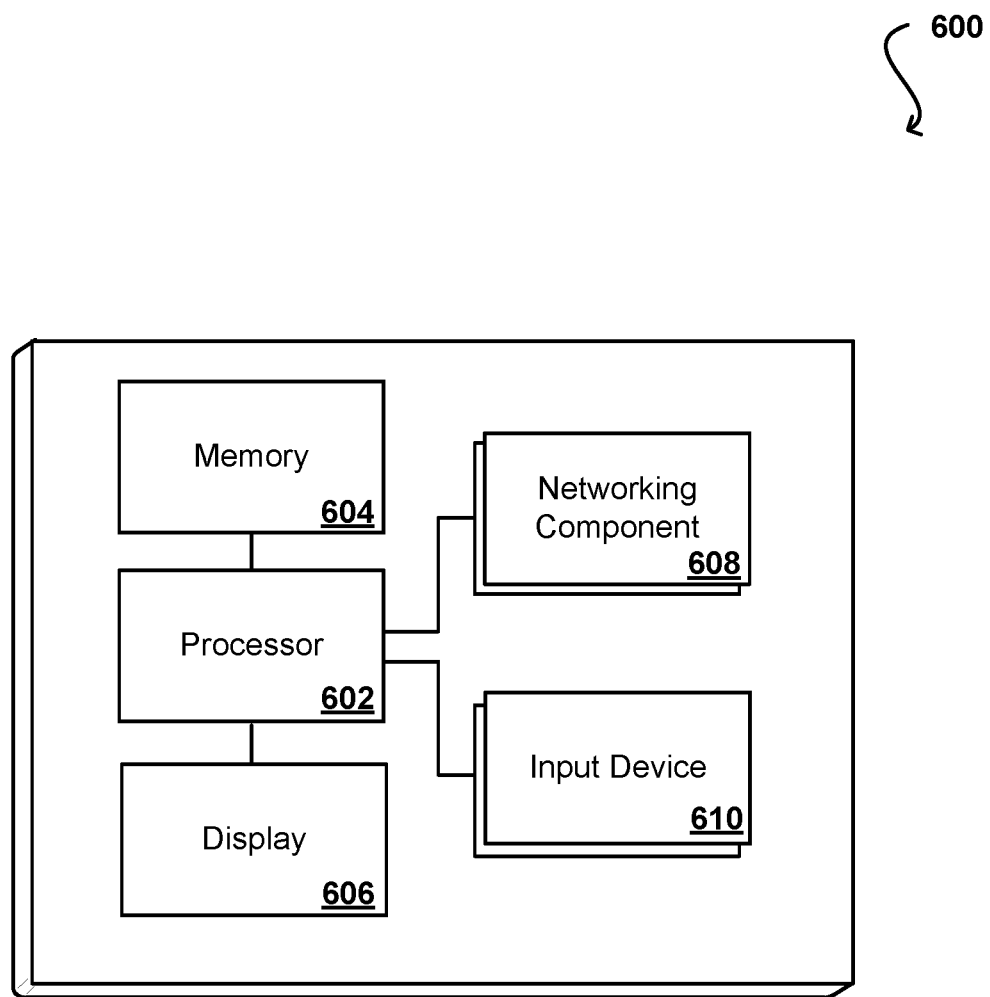
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising: determining, by an ingest process executing on at least one processor of a computer system, a set of serial digital interfaces (SDIs) accessible to the computer system;
   initiating SDI readers for the set of SDIs, wherein the SDI readers are configured to select a mode from a set of operating modes, the set of operating modes comprising an ingest mode facilitating concurrent reading from and monitoring of an SDI and a monitoring mode facilitating monitoring of an SDI;
   reading, concurrently from the set of SD's using the SDI readers, media data;
   monitoring, concurrently from the media data for the set of SDIs, at least one parameter value;
   receiving a request to provide media data from a specified SDI of the set to a transcoding process;
   causing the media data, obtained from the specified SDI, to be copied to a buffer of a shared memory device accessible to the computer system and the transcoding process, the media data being copied to the buffer of the shared memory device using a first SDI reader of the set of SDI readers when the first SDI reader is configured to operate in the ingest mode; and
   enabling the transcoding process to obtain the media data from the shared memory device concurrently with the media data being monitored by the ingest process.

2. The computer-implemented method of claim 1, further comprising:
   receiving the request to the ingest process over the shared memory.

3. The computer-implemented method of claim 1, wherein the media data includes at least one of audio data or video data, and wherein the at least one parameter value includes at least one of an audio format, a video format, timecode data, audio volume level, resolution, or frame rate.

4. The computer-implemented method of claim 1, further comprising:
   detecting an additional SDI input;
   initiating a new SDI reader for the additional SDI input; and enabling the transcoding process to obtain new data, corresponding to the additional SDI input, from the shared memory device without an update to the transcoding process.

5. The computer-implemented method of claim 1, further comprising:
   enabling multiple transcoding processes to obtain the data from the shared memory device concurrently with the data being monitored by the ingest process.

6. A computer-implemented method, comprising:
   monitoring, by an ingest process executing on at least one processor of a computer system, a set of media interfaces accessible to the computer system, wherein the ingest process is configured to select a mode from a set of operating modes, the set of operating modes comprising an ingest mode facilitating concurrent reading from and monitoring of a media interface and a monitoring mode facilitating monitoring of a media interface, wherein the monitoring comprises concurrently monitoring at least one parameter value of the media data from the set of media interfaces;
   receiving a request to provide data, from a specified media interface of the set, to a transcoding process;
   causing the data, obtained from the specified media interface, to be copied to a buffer of an inter-process communication (IPC) component accessible to the computer system using the ingest process when the ingest process is configured to operate in the ingest mode; and
   enabling the transcoding process to obtain the data from the IPC component at least partly at the same time as the data from the specified media interface being monitored by the ingest process.

7. The computer-implemented method of claim 6, wherein the media interface includes at least one of a serial digital interface (SDI), a high-definition media interface (HDMI), or an asynchronous serial interface (ASI).

8. The computer-implemented method of claim 6, further comprising:
   determining, by the ingest process, the set of media interfaces;
   initiating media readers for the set of media interfaces; and
   reading concurrently from the media interfaces using the media readers.

9. The computer-implemented method of claim 8, further comprising:
   detecting an additional media interface;
   initiating a new media reader for the additional media interface; and enabling the transcoding process to obtain new data, corresponding to the additional media interface, from the IPC component without an update to the transcoding process.

10. The computer-implemented method of claim 6, further comprising:
    causing the data obtained from the IPC component to be demuxed into audio, video, and metadata components; and
    causing the audio component and the video component to be passed into separate, respective transcoding pipelines via the transcoding process.

11. The computer-implemented method of claim 6, further comprising:
    receiving the request to the ingest process over the IPC component, wherein the IPC component comprises shared memory.

12. The computer-implemented method of claim 6, wherein the data includes at least one of audio data or video data, and wherein the at least one parameter value includes at least one of an audio format, a video format, timecode data, audio volume level, resolution, or frame rate.

13. The computer-implemented method of claim 6, further comprising:
    enabling multiple transcoding processes to obtain the data from the IPC component at least partly at the same time as the data being monitored by the ingest process.

14. The computer-implemented method of claim 6, further comprising:
    obtaining monitored data for at least one media interface using an application programming interface (API) in communication with the ingest process.

15. The computer-implemented method of claim 6, further comprising:
    determining that a specified media interface is unavailable; and generating an alarm to be passed over the IPC component to a destination of transcoded media corresponding to the specified media interface.

16. A system, comprising:
    at least one processor; and memory including instructions that, when executed by the system, cause the system to:

monitor, by an ingest process executing on at least one processor, a set of media interfaces, wherein the ingest process is configured to select a mode from a set of operating modes, the set of operating modes comprising an ingest mode facilitating concurrent reading from and monitoring of a media interface and a monitoring mode facilitating monitoring of a media interface, wherein the monitoring comprises concurrently monitoring at least one parameter value of the media data from the set of media interfaces;

receive a request to provide data, from a specified media interface of the set, to a transcoding process;

cause the data, obtained from the specified media interface, to be copied to a buffer of an IPC component using the ingest process when the ingest process is configured to operate in the ingest mode; and enable the transcoding process to obtain the data from the IPC component at least partly at the same time as the data being monitored by the ingest process.

17. The system of claim 16, wherein the instructions when executed further cause the system to:

determine, by the ingest process, the set of media interfaces;

initiate media readers for the set of media interfaces; and read concurrently from the media interfaces using the media readers.

18. The system of claim 16, wherein the instructions when executed further cause the system to:

detect an additional media interface;

initiate a new media reader for the additional media interface; and enable the transcoding process to obtain new data, corresponding to the additional media interface, from the IPC component without an update to the transcoding process.

19. The system of claim 16, wherein the data includes at least one of audio data or video data, and wherein the at least one parameter value includes at least one of an audio format, a video format, timecode data, audio volume level, resolution, or frame rate.

20. The system of claim 16, wherein the instructions when executed further cause the system to:

enable multiple transcoding processes to obtain the data from the IPC component at least partly at the same time as the data being monitored by the ingest process.

* * * * *